United States Patent
Yatsu (10) Patent No.: US 7,583,254 B2
(45) Date of Patent: Sep. 1, 2009

(54) INPUT DEVICE INCLUDING POWER GENERATING DEVICE

(75) Inventor: Nobuo Yatsu, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 592 days.

(21) Appl. No.: 11/048,827

(22) Filed: Feb. 3, 2005

(65) Prior Publication Data

US 2006/0087494 A1    Apr. 27, 2006

(30) Foreign Application Priority Data

Oct. 21, 2004    (JP) .............................. 2004-306917

(51) Int. Cl.
*G09G 5/08* (2006.01)

(52) U.S. Cl. ....................... 345/163; 345/184

(58) Field of Classification Search ................ 345/156, 345/159, 163, 168, 180, 184; 368/184
See application file for complete search history.

(56) References Cited

U.S. PATENT DOCUMENTS

| | | | | |
|---|---|---|---|---|
| 6,137,479 A | * | 10/2000 | Olsen et al. | 345/169 |
| 6,373,789 B2 | * | 4/2002 | Koike et al. | 368/204 |
| 6,485,172 B1 | * | 11/2002 | Takahashi et al. | 368/148 |
| 6,686,903 B1 | * | 2/2004 | Peng | 345/163 |
| 6,801,967 B2 | * | 10/2004 | Nakamura et al. | 710/62 |
| 6,903,725 B2 | * | 6/2005 | Nacson | 345/163 |
| 6,934,222 B2 | * | 8/2005 | Fujimori | 368/204 |
| 7,158,116 B2 | * | 1/2007 | Poltorak | 345/158 |
| 2003/0063045 A1 | * | 4/2003 | Fleming | 345/30 |
| 2003/0080938 A1 | * | 5/2003 | Lian et al. | 345/156 |
| 2003/0142065 A1 | * | 7/2003 | Pahlavan | 345/156 |
| 2005/0190152 A1 | * | 9/2005 | Vaganov | 345/157 |

FOREIGN PATENT DOCUMENTS

| | | |
|---|---|---|
| JP | 6-59810 | 3/1994 |
| JP | 2001-125722 | 5/2001 |
| JP | 2002-132440 | 5/2002 |

\* cited by examiner

*Primary Examiner*—Chanh Nguyen
*Assistant Examiner*—Calvin C Ma
(74) *Attorney, Agent, or Firm*—Staas & Halsey LLP

(57) ABSTRACT

A disclosed input device has an input section to detect acceleration applied to the device body and output a detection signal corresponding to the detected acceleration. The device includes a power generating section to generate electric power in accordance with the acceleration applied to the device body, a power storing section to store the electric power generated by the power generating section, and a power source generating section to generate power for driving the input section with the electric power generated by the power generating section or the electric power stored in the power storing section.

12 Claims, 10 Drawing Sheets

INPUT DEVICE INCLUDING POWER GENERATING DEVICE

BACKGROUND OF THE INVENTION

1. Field of the Invention

The present invention relates to an input device, and particularly relates to an input device for generating and sending an input signal in accordance with acceleration occurring during operations.

2. Description of the Related Art

Computers use various input devices for input and other operations. Common input device is a keyboard and a mouse. A mouse is a device that moves a pointer shown on a display device when a user moves the device body on the desk.

In recent years, with the spread of large displays device, demand for operating computers from remote places is growing. In such remote operations, input operations in the air are also demanded. In order to meet such demands, a three-dimensional input device is offered.

A three-dimensional input device disclosed in Japanese Patent Laid-Open Publication No. 2002-132440 has a gyro and an acceleration sensor, etc., therein. The gyro measures angular speed of the device body, and the acceleration sensor measures acceleration of the device body. Based on these measurements, detection data corresponding to the movement of the device body in the air are generated. The detection data are transmitted to a computer by wireless or other means, so that the input operation is performed.

In a remote operation of a computer with use of an input device such as a mouse, wireless data transmission is required to avoid the use of a long cable connecting the mouse and the computer, since such a long cable might degrade usability and handiness. The input device of this type using wireless data transmission must have an internal power source for driving an internal circuit. As the internal power source, batteries have been commonly used.

A battery-driven input device requires battery replacement when the battery is exhausted. If the device is used frequently or used for a long time, the battery needs to be replaced during use. This makes the maintenance of the device troublesome.

A wireless mouse device disclosed in Japanese Patent Laid-Open Publication No. Hei 6-59810 is provided with a generator and a secondary battery therein to eliminate the need for battery replacement. In this type of wireless mouse device, a generator is driven by the rolling of a ball and the generated power is stored in a secondary battery. This configuration, however, does not allow generation of a large amount of power.

A remote controller requiring no battery replacement disclosed in Japanese Patent Laid-Open Publication No. 2001-125722 is also provided with an internal generator. This remote controller generates power and transmits a command when a user rotates a ring.

According to such background, wireless input devices have mostly been driven by a battery, and require battery replacement when the battery is exhausted. If the devices are used frequently or used for a long time, the battery replacement might be required during use. This makes the device maintenance troublesome.

SUMMARY OF THE INVENTION

It is a general object of the present invention to provide an input device to solve at least one problem mentioned above. It is a more specific object of the present invention to provide an input device that does not require maintenance such as replacement of batteries.

According to an aspect of the present invention, there is provided an input device having an input section to detect acceleration applied to a device body and output a detection signal corresponding to the detected acceleration, including a power generating section to generate electric power in accordance with the acceleration applied to the device body; a power storing section to store the electric power generated by the power generating section; and a power source generating section to generate power for driving the input section with the electric power generated by the power generating section or the electric power stored in the power storing section.

According to the above aspect of the present invention, since the input device includes the power generating section to generate electric power in accordance with the acceleration applied to the device body, the power storing section to store the electric power generated by the power generating section, and the power source generating section to generate power for driving the input section with the electric power generated by the power generating section or the electric power stored in the power storing section, it is possible to generate electric power in accordance with the acceleration applied to the device body and store it. Accordingly, a relatively large amount of electric power can be obtained, so that the device can be driven without battery replacement. Also, since electric power is generated through operational movements, the device can be driven even if used frequently or used for a long time. Thus, the need for maintenance is eliminated.

DESCRIPTION OF THE PREFERRED EMBODIMENTS

First Embodiment

[System Configuration]

Figure 1:
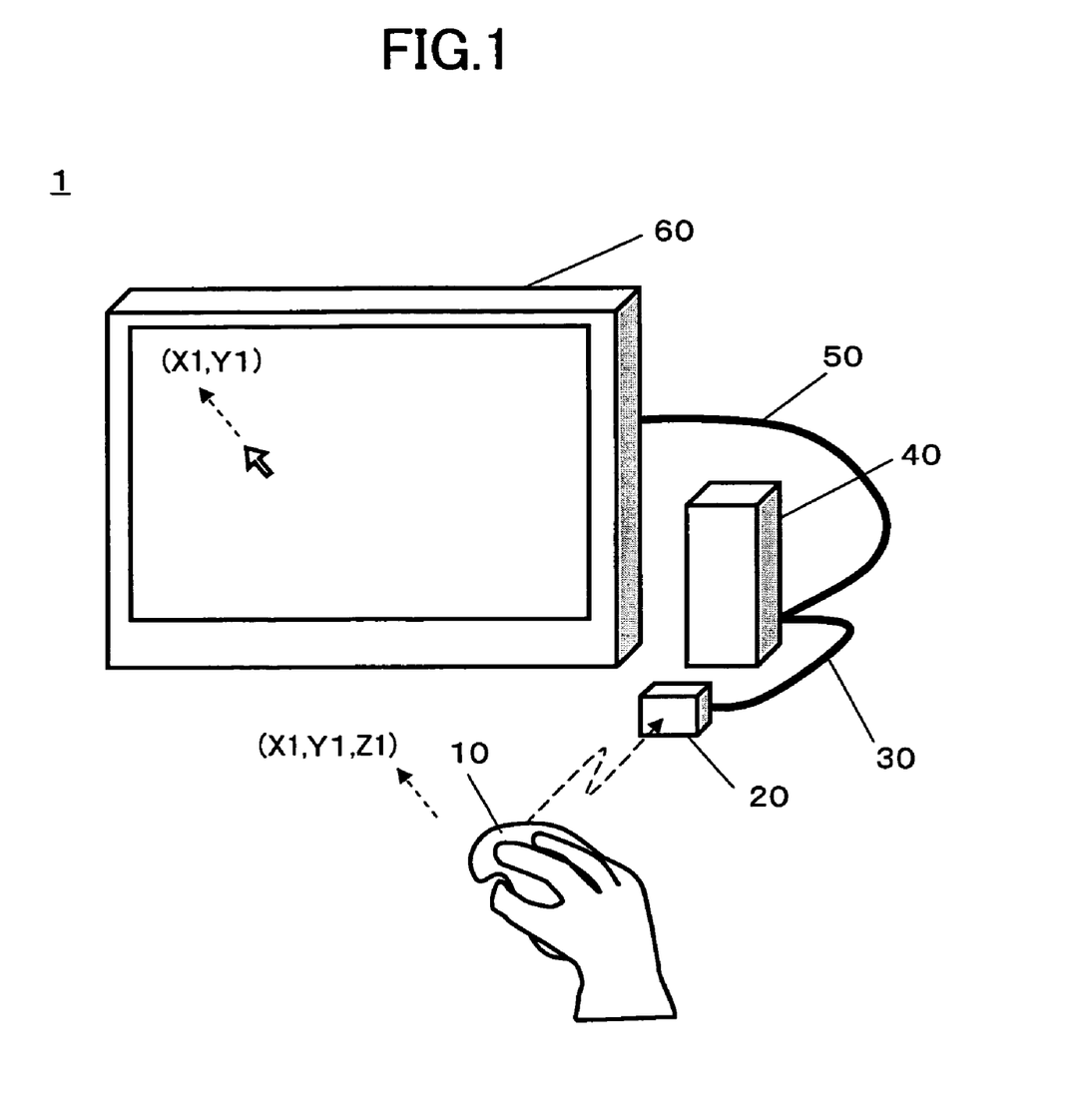
FIG. 1 is a schematic diagram showing a system configuration according to one embodiment of the present invention.

FIG. 1 is a schematic diagram showing a system configuration according to a first embodiment of the present invention.

A system 1 of this embodiment comprises an input device 10, a communication unit 20, a connection cable 30, a computer device 40, a connection cable 50, and a display 60.

The input device 10 controls the movement of a pointer P shown on a display screen of the display 60 when a user moves the device body in the air in three-dimensional directions. For instance, when the input device 10 is moved in an arrow X1, Y1, Z1 direction, the input device 10 generates coordinate data for moving the pointer P on the screen of the display 50 in a corresponding arrow x1, y1 direction to transmit the data wirelessly to the communication unit 20. The input device 10 also generates input data as operational information in response to the operation of switches and the like to transmit the data to the communication unit 20.

The communication unit 20, comprising a wireless LAN unit and a wireless communication system for a point-to-point connection, receives the coordinate data and the input data transmitted from the input device 10. The communication unit 20 is connected to the computer device 40 via the connection cable 30. The communication unit 20 and the computer device 40 are connected via, for example, a USB interface. The communication unit 20 transmits the received coordinate data and input data to the computer device 40 via the connection cable 30.

The computer device 40 is connected to the display 60 via a connection cable 50. The computer device 40 moves the position of the pointer P shown on the display 60 based on the coordinate data supplied from the communication unit 20. The computer device 40 also selects icons based on the input data supplied from the communication unit 20 and executes programs. The display 60 including a CRT, a LCD or the like shows a screen corresponding to display data supplied from the computer device 40.

[Input Device 10]

The following is a description of the input device 10.

Figure 2:
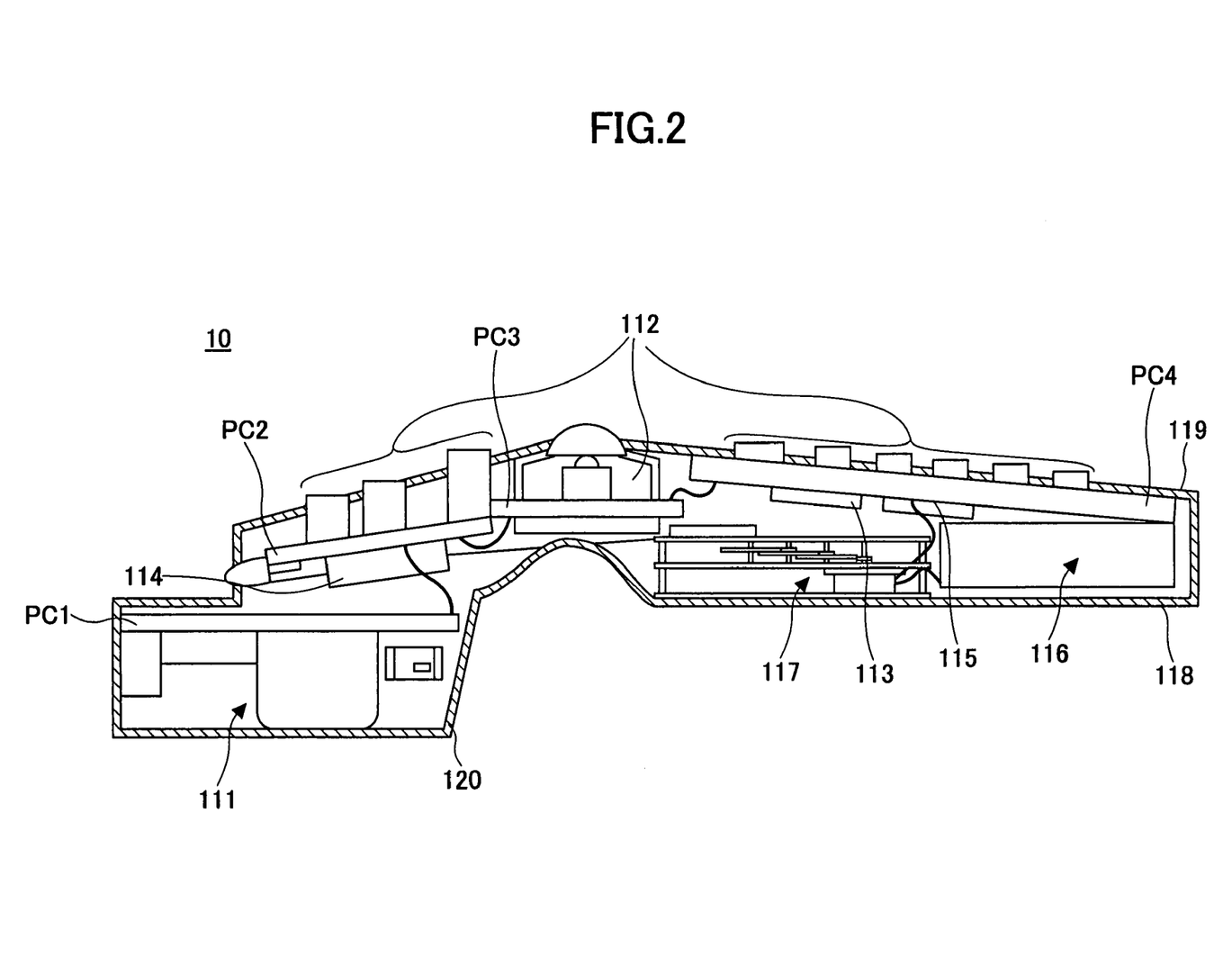
FIG. 2 is a cross section of an input device.
Figure 3:
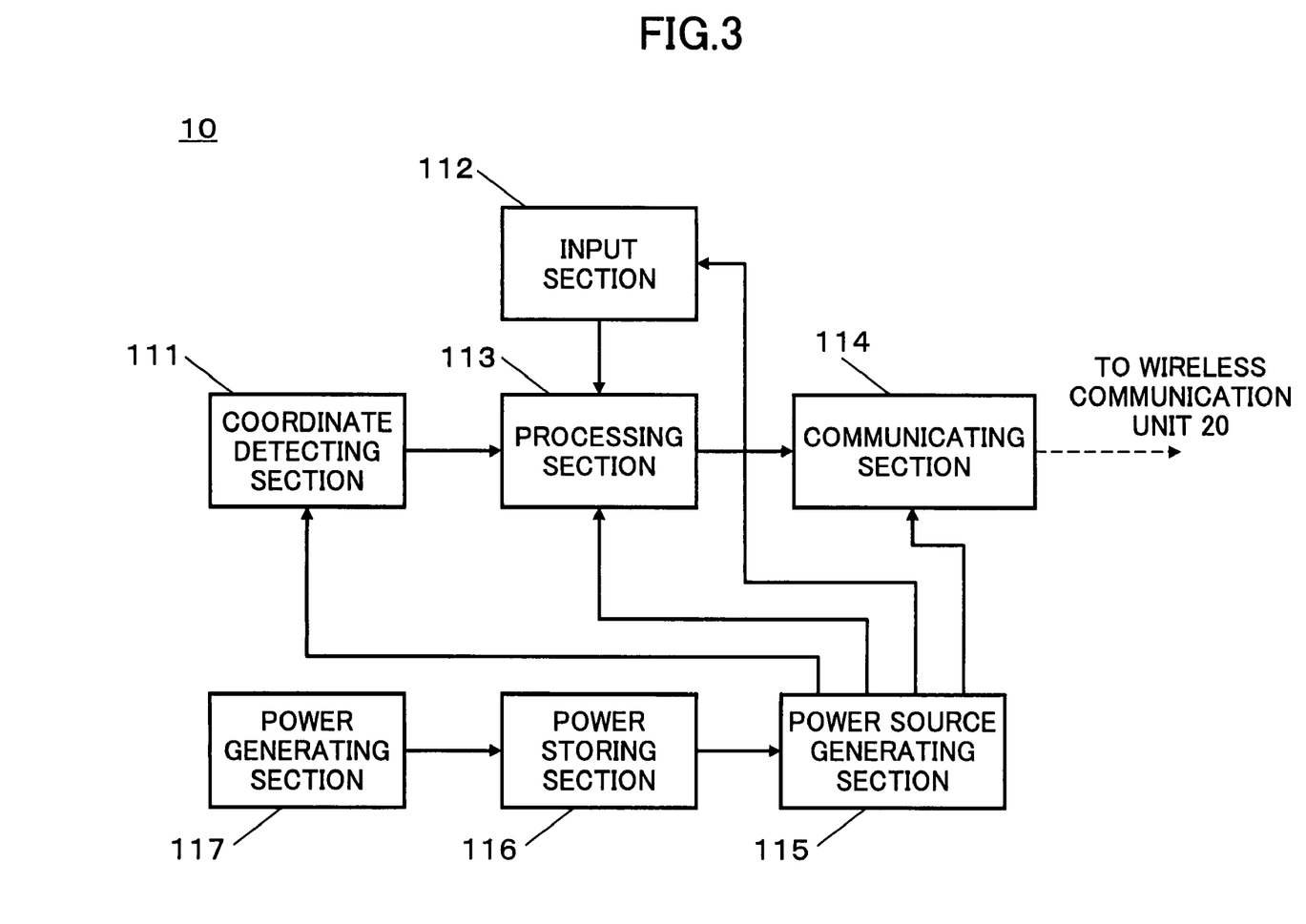
FIG. 3 is a block diagram of the input device.

FIG. 2 is a cross section of the input device 10, and FIG. 3 is a block diagram of the input device 10.

The input device 10 of this embodiment comprises a coordinate detecting section 111, an input section 112, a processing section 113, a communicating section 114, a power source generating section 115, a power storing section 116, and a power generating section 117, which are housed in a housing section formed by a case 118, an upper cover 119 and a lower cover 120.

The coordinate detecting section 111, comprising a gyro and an acceleration sensor, is installed on a circuit board PC1 to output a detection signal corresponding to the movement of a user. For example, the gyro detects the rotating angle of the device body, and outputs a detection signal corresponding to the detected rotating angle. The acceleration sensor detects the acceleration applied to the device body, and outputs a detection signal corresponding to the detected acceleration.

The input section 112, comprising a switch, a pointing device and the like, is installed on circuit boards PC2, PC3 and PC4 to generate an input signal corresponding to switch operations. For example, the input section 112 outputs an input signal for high level when the switch is on, whereas it outputs an input signal for low level when the switch is off.

The processing section 113 is installed on the circuit board PC4 to generate coordinate data based on the detection signal supplied from the coordinate detecting section 111, and also generates input data based on the input signal from the input section 112. The coordinate data and the input data generated by the processing section 113 are supplied to the communicating section 114.

The communicating section 114 is installed on the circuit board PC2 to modulate and amplify a carrier wave based on the coordinate data and the input data supplied from the processing section 113.

The power source generating section 115 comprises, for example, a power supply circuit such as a switching regulator, a series regulator or a constant voltage circuit. The power source generating section 115 is installed on the circuit board PC4 to generate drive voltage for driving the coordinate detecting section 111, the input section 112, the processing section 113 and the communicating section 114 with the electric power stored in the power storing section 116.

The power storing section 116 housed in the case 118 comprises an electrolytic capacitor, an electric double layer capacitor, or a secondary battery such as a lithium-ion battery. The power storing section 116 stores the electric power generated by the power generating section 117 and supplies the stored electric power to the power source generating section 115.

[Power Generating Section 117]

Figure 4:
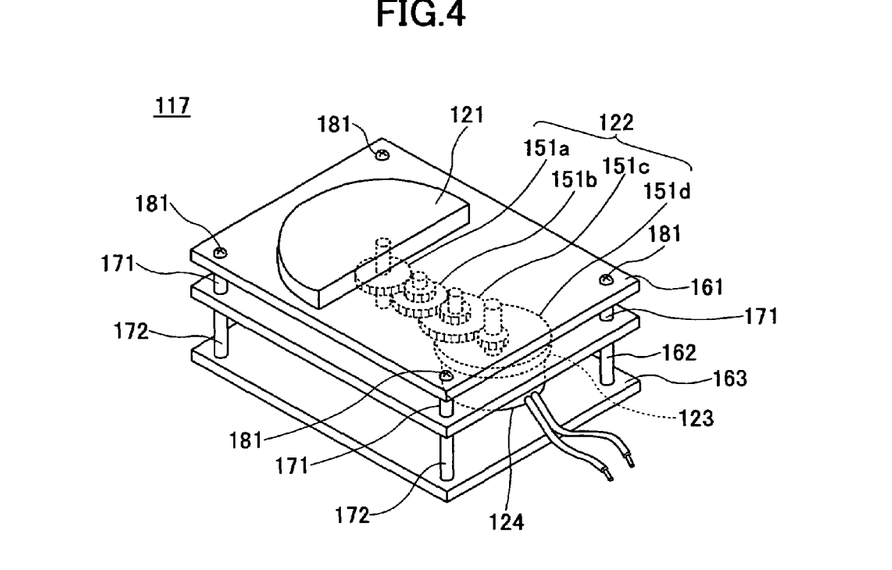
FIG. 4 is a perspective assembly diagram showing a power generating section.
Figure 5:
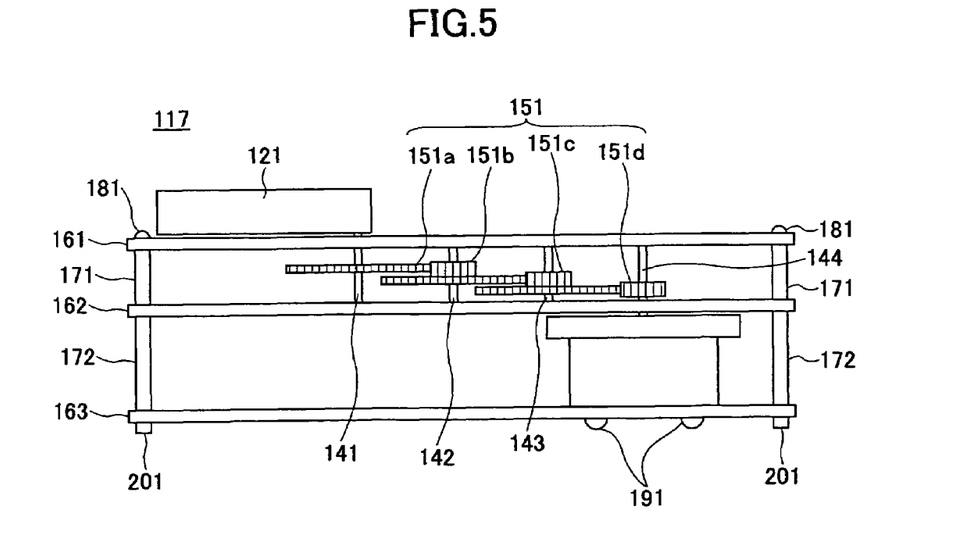
FIG. 5 is a cross section of the power generating section.
Figure 6:
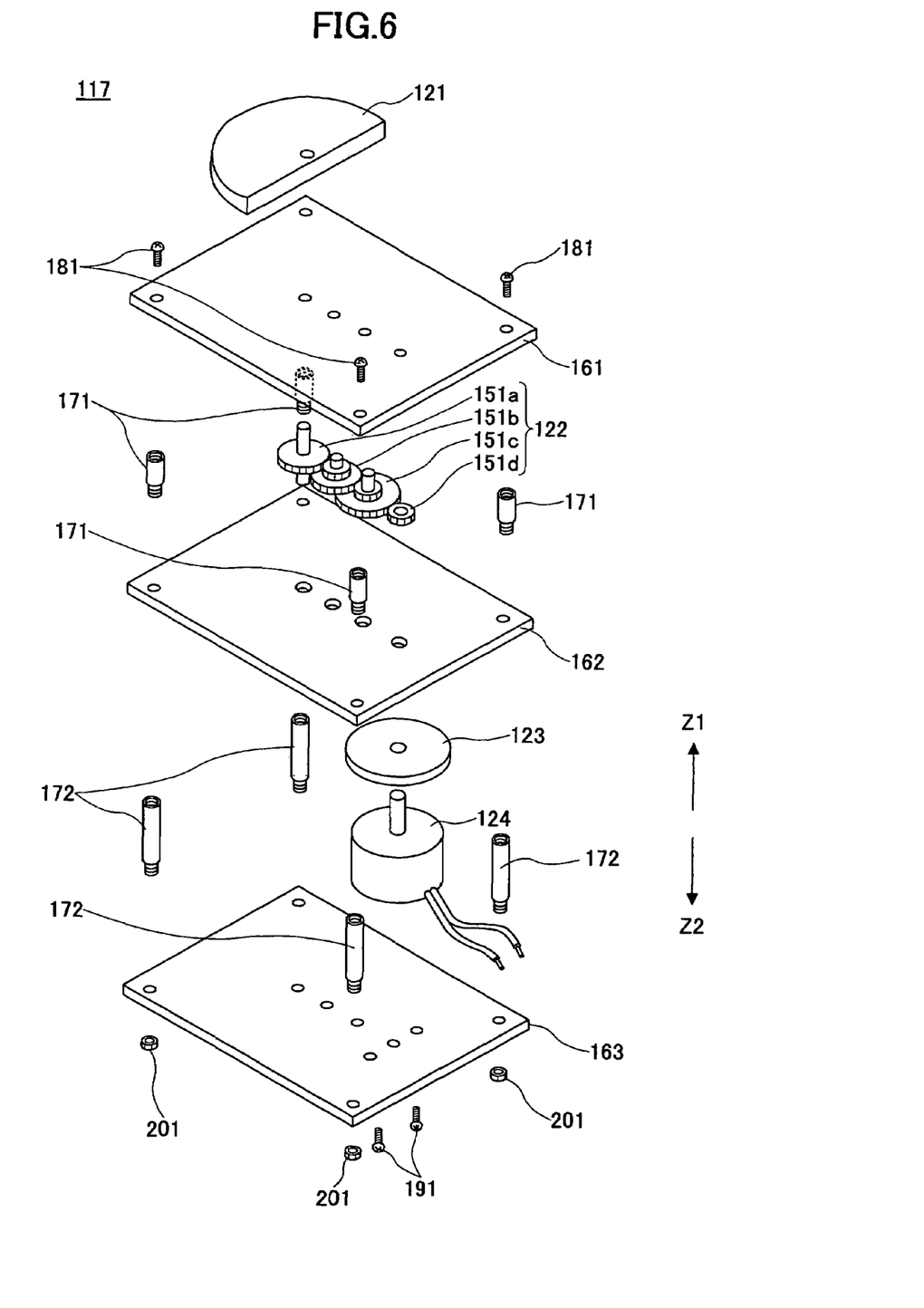
FIG. 6 is an exploded perspective view of the power generating section.

FIGS. 4 to 6 respectively show an assembly diagram of the power generating section 117, a cross section thereof, and an exploded perspective view thereof.

The power generating section 117 generates electric power in accordance with acceleration applied to the device body and stores the electric power in the power storing section 116. The power generating section 117 comprises a rotor 121, a step-up gear mechanism 122, a flywheel 123, a power generator 124, and a rectifying/smoothing circuit 125 (see FIG. 7).

The rotor 121 formed of a generally semicircular metal plate is held at the center thereof (assuming the metal plate is a circle) to be rotatable around a rotary shaft 141, and is adapted to rotate in accordance with the acceleration applied to the device. The rotor 121 is not limited to the semicircular rotor, but includes one having the gravity center at a position deviated from the rotary shaft 141.

The step-up gear mechanism 122 comprises a first gear 151a, a second gear 151b, a third gear 151c, and a fourth gear 151d. The first gear 151a is fixed to the rotary shaft 141 to be rotated in accordance with the rotation of the rotor 121. The second gear 151b is a two-step gear fixed to a rotary shaft 142. A small gear thereof meshes with the first gear 151a while multiplying the rotational speed of the first gear 151a. The third gear 151c is a two-step gear fixed to a rotary shaft 143. A small gear thereof meshes with a large gear of the second gear 151b while multiplying the rotational speed of the second gear 151b. The fourth gear 151d fixed to a rotary shaft 144 meshes with a large gear of the third gear 151c while multiplying the rotational speed of the third gear 151c to rotate the rotary shaft 144 at the multiplied speed.

The step-up gear mechanism 122 transmits the rotation of the rotary shaft 141 to the rotary shaft 144 while multiplying the rotational speed. The rotary shafts 141, 142 and 143 are held between a retainer plate 161 and a retainer plate 162. The retainer plate 161 and the retainer plate 162 are spaced apart a certain distance with spacers 171 interposed therebetween. The end of the spacer 171 in an arrow Z1 direction is formed as a screw hole, into which a screw 181 is threaded through the retainer plate 161 so that the spacer 171 is held by the retainer plate 161. The end of the spacer 171 in an arrow Z2 direction is formed as a screw, which is threaded into a screw hole formed at the end of a spacer 172 in the arrow Z1 direction so that the spacer 171 is held by the retainer plate 162.

The flywheel 123 is fixed to the input shaft 144 of the power generator 124 to maintain the rotation of the input shaft 144 of the power generator 124.

The power generator 124 is fixed to a retainer plate 163 with screws 191 threaded therein through the retainer plate 163. The retainer plate 162 and the retainer plate 163 are spaced apart a certain distance with the spacers 172 interposed therebetween. The end of the spacer 172 in the arrow Z1 direction is formed as a screw hole, into which a screw formed at the end of the spacer 171 in the arrow Z2 direction is threaded through the retainer plate 162 so that the spacer 172 is held by the retainer plate 162. The end of the spacer 172 in the arrow Z2 direction is formed as a screw, which is threaded into a nut 201 through the retainer plate 163 so that the spacer 172 is held by the retainer plate 163.

In the power generator 124, for example, a coil wound around a rotor rotates in response to the rotation of the input shaft 144 and crosses the flux generated by permanent magnets arranged nearby. The coil thereby generates electromotive force, which generates electric power. The electric power generated by the power generator 124 is supplied to the rectifying/smoothing circuit 125.

The rectifying/smoothing circuit 125 rectifies and smoothens the voltage supplied from the power generator 124 to be output as direct-current voltage. The direct-current voltage rectified and smoothened by the rectifying/smoothing circuit 125 is applied to the power storing section 116. The electric power is stored in the power storing section 116 by the direct-current voltage being supplied from the rectifying/smoothing circuit 125.

First Modification

Figure 7:
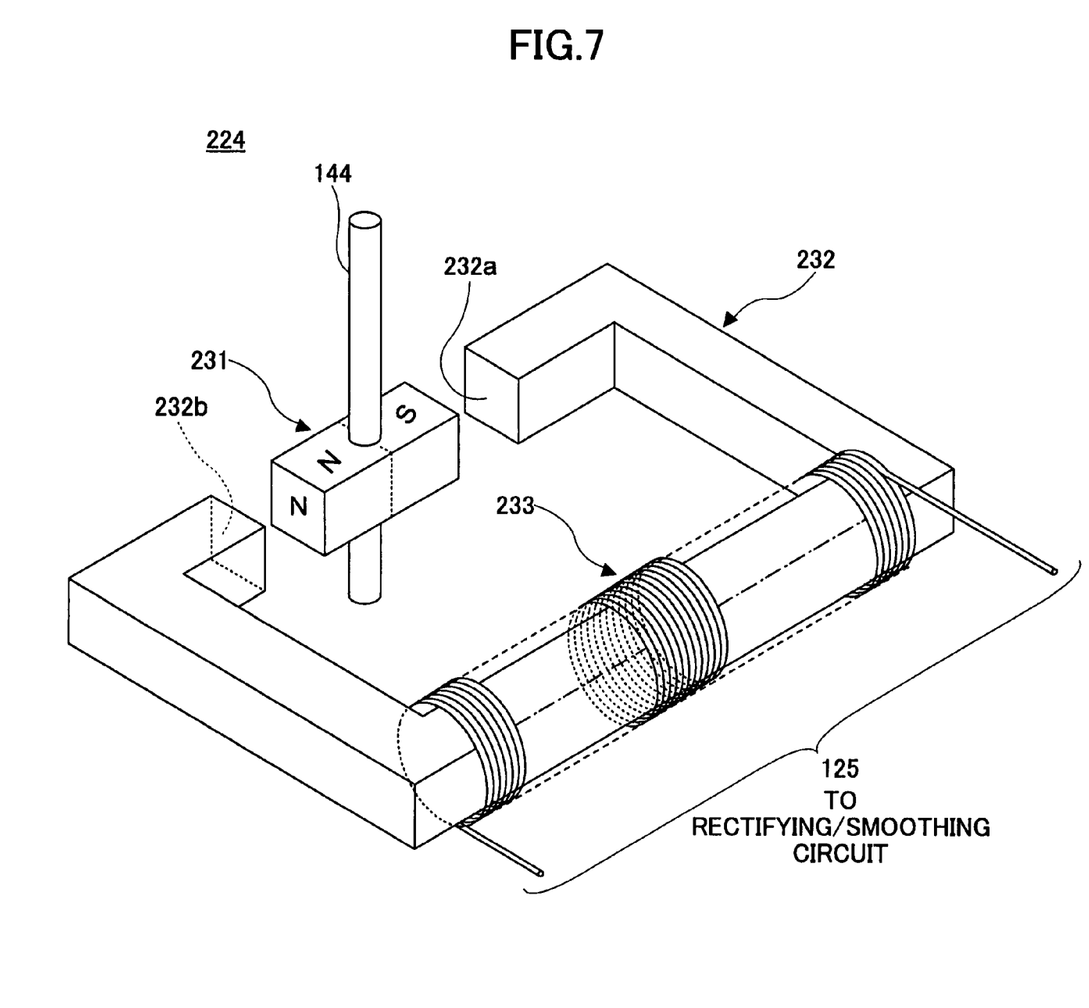
FIG. 7 is a perspective view showing a modification of a power generator.

FIG. 7 is a perspective view showing a modification of the power generator 124. In FIG. 7, the components corresponding to those in FIGS. 3 through 6 are denoted by the same reference numerals, and are not further described.

A power generator 224 according to this modification comprises a magnet 231, a yoke 232 and a coil 233.

The magnet 231 is fixed to an input rotary shaft 144 of the power generator 224 to be rotatable around the rotary shaft 144 so that the flux is generated in a direction orthogonal to the rotary shaft 144. The yoke 232 is a lamination of magnetic plate with high magnetic permeability, and is generally rectangular in plan view, a part of one side of which is removed. Since the yoke 232 is arranged to have end faces 232a and 232b of the removed part face each other across the magnet 231, a magnetic circuit is formed by the flux of the magnet 231. The coil 233 is wound around the yoke 232 so that the yoke 232 extends through both ends thereof, and generates voltage in accordance with the change of the flux generated by the rotating magnet 231. Both ends of the coil 233 are connected to the rectifying/smoothing circuit 125. The voltage generated in the coil 233 is rectified and smoothened by the rectifying/smoothing circuit 125, and causes electric power to be stored in the power storing section 116.

Second Modification

Figure 8:
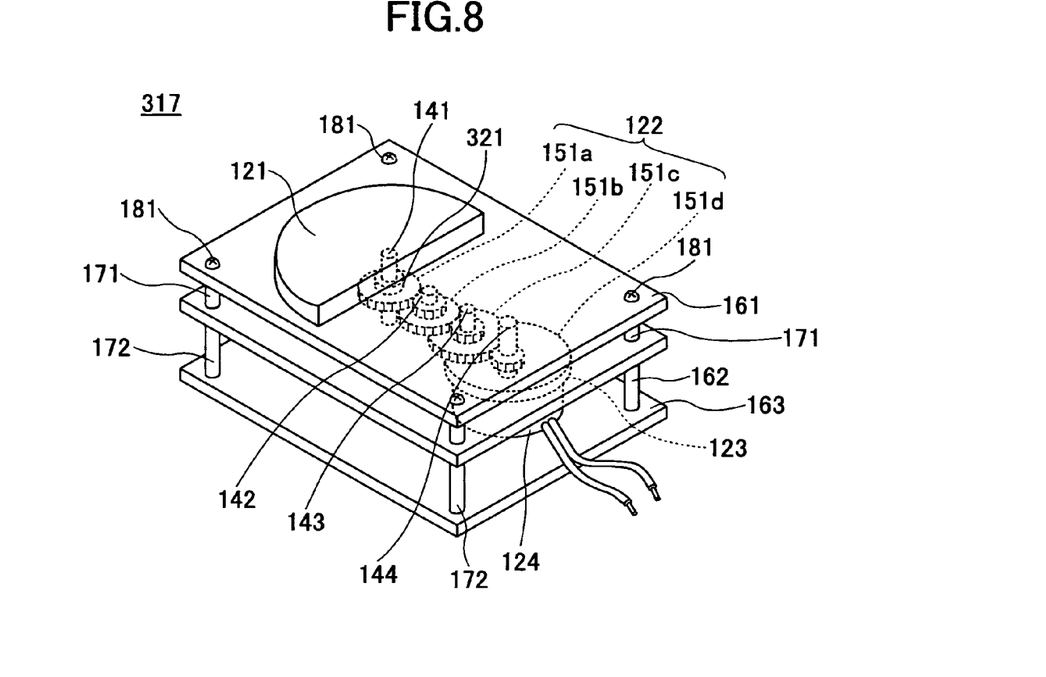
FIG. 8 is a perspective assembly diagram showing a modification of the power generating section.
Figure 9:
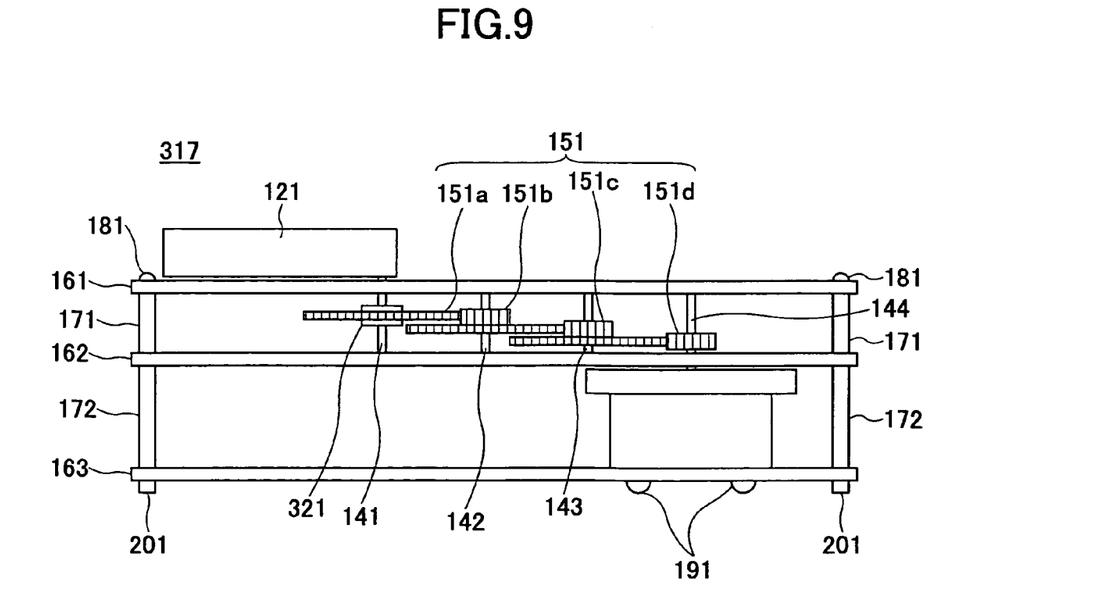
FIG. 9 is a cross section showing the aforesaid modification of the power generating section.
Figure 10:
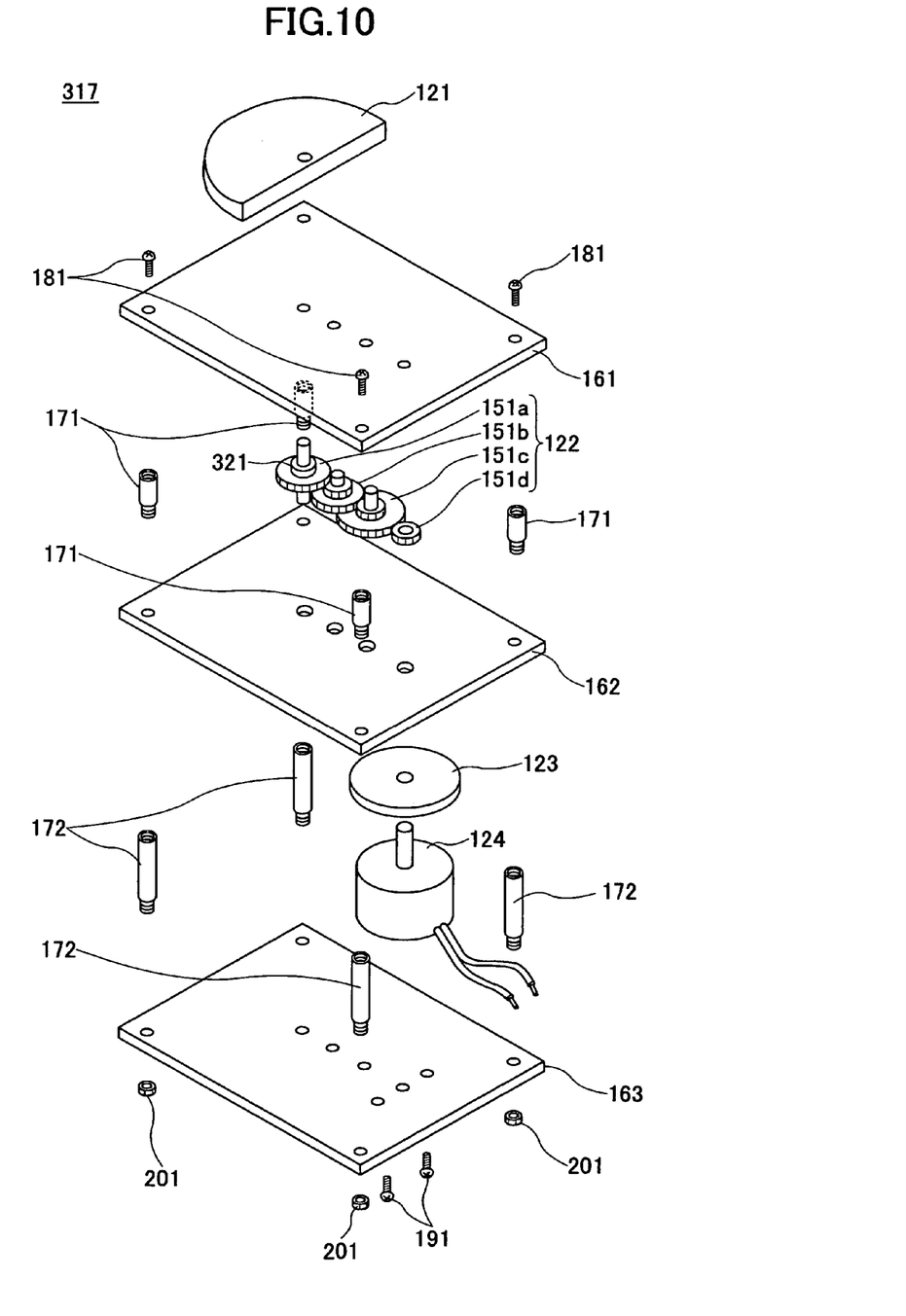
FIG. 10 is an exploded perspective view showing the aforesaid modification of the power generating section.

FIGS. 8 to 10 respectively show an assembly diagram of a modification of the power generating section 117, a cross section thereof, and an exploded perspective view thereof. In FIGS. 8 through 10, the components corresponding to those in FIGS. 3 to 6 are denoted by the same reference numerals, and are not be further described.

A power generating section 317 of this embodiment is provided with a one-way clutch mechanism 321 between the rotary shaft 141 and the first gear 151a of the step-up gear mechanism 122. The one-way clutch mechanism 321 transmits the rotation of the rotary shaft 141 to the first gear 151a when the rotation of the rotary shaft 141 is faster than the rotation of the first gear 151a of the step-up gear mechanism 122. When the rotation of the rotary shaft 141 becomes slower than the rotation of the first gear 151a of the step-up gear mechanism 122, the rotary shaft 141 rotates without interlocking the first gear 151a so as to not transmit the rotation of the rotary shaft 141 to the first gear 151a. The flywheel can thus stably rotate without being affected by the rotation of the rotor 121.

Third Modification

Figure 11:
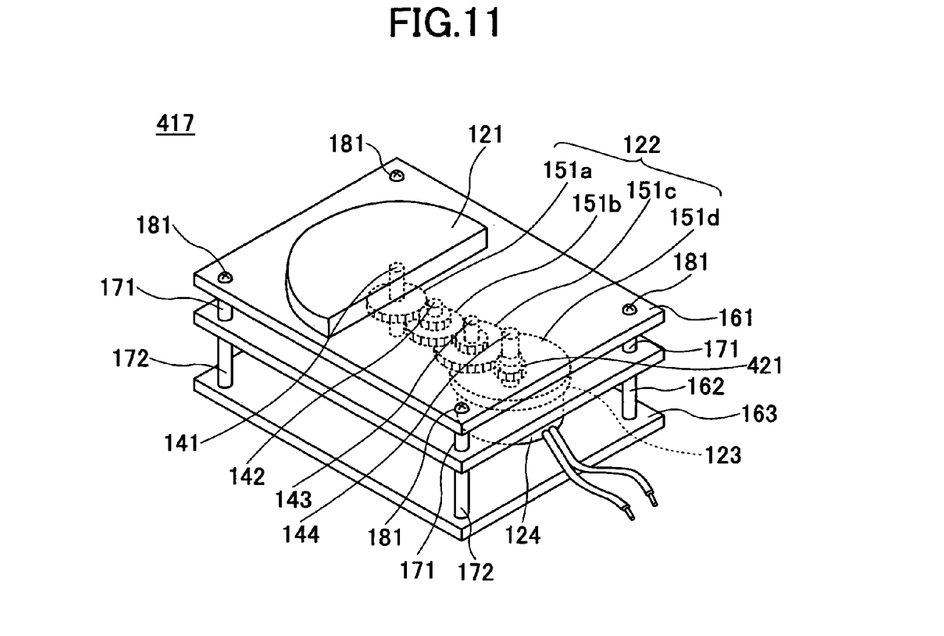
FIG. 11 is a perspective assembly diagram showing another modification of the power generating section.
Figure 12:
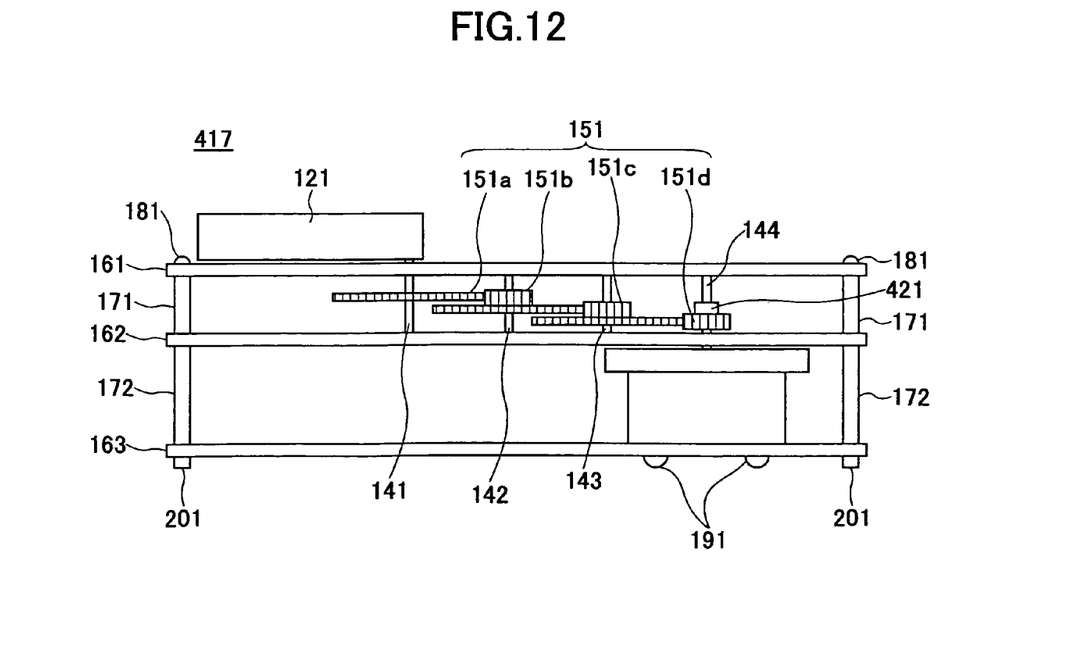
FIG. 12 is a cross section showing the aforesaid modification of the power generating section.
Figure 13:
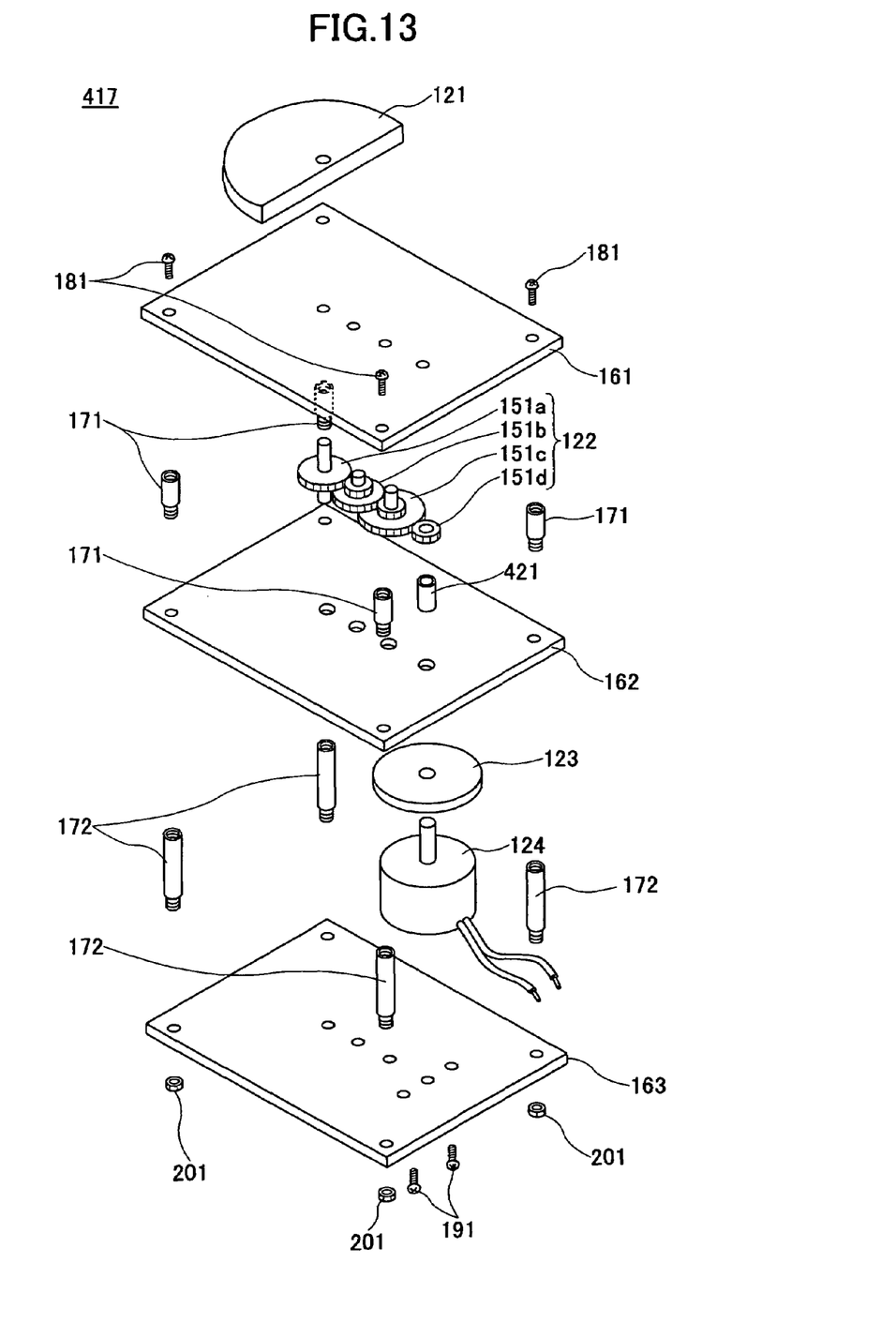
FIG. 13 is an exploded perspective view showing the aforesaid modification of the power generating section.

FIGS. 11 to 13 respectively show an assembly diagram of another modification of the power generating section 117, a cross section thereof, and an exploded perspective view thereof. In FIGS. 11 through 13, the components corresponding to those in FIGS. 3 through 5 are denoted by the same reference numerals, and are not further described.

A power generating section 417 of this embodiment is provided with a one-way clutch mechanism 421 between the fourth gear 151d of the step-up gear mechanism 122 and the rotary shaft 141 as the input shaft of the power generator 124. The one-way clutch mechanism 421 transmits the rotation of the fourth gear 151d to the rotary shaft 144 when the rotation of the fourth gear 151d of the step-up gear mechanism 122 is faster than the rotation of the rotary shaft 144. When the rotation of the fourth gear 151d of the step-up gear mechanism 122 becomes slower than the rotation of the rotary shaft 144, the fourth gear 151d rotates without interlocking the rotary shaft 144 so as to not transmit the rotation of the fourth gear 151d to the rotary shaft 144. The flywheel 123 can thus stably rotate without being affected by the rotation of the rotor 121.

The present application is based on Japanese Priority Application No. 2004-306917 filed on Oct. 21, 2004, with the Japanese Patent Office, the entire contents of which are hereby incorporated by reference.

What is claimed is:

1. An input device, comprising;
an input section generating and outputting an input signal corresponding to an operation of a device body of the input device;
a coordinate detecting section detecting a rotating angle of the device body and an acceleration applied to the device body and outputting a detection signal corresponding to the detected rotating angle and the detected acceleration;
a processing section generating coordinate data based on the detection signal supplied from the coordinate detecting section and generating input data based on the input signal supplied from the input section;
a communicating section modulating and amplifying a carrier wave based on the coordinate data and the input data supplied by the processing section;
a power generating section to generate electric power in accordance with the acceleration applied to the device body;
a power storing section to store the electric power generated by the power generating section; and
a power source generating section comprising a power supply circuit to generate power for driving the input section, the coordinate detecting section, the processing section, and the communicating section with the electric power generated by the power generating section or the electric power stored in the power storing section, wherein the power generating section comprises:
- a rotor having a center of gravity at a position deviated from a rotary shaft of the rotor and, thus, being configured to rotate in accordance with the acceleration;
- a step-up gear mechanism connected to the rotary shaft of the rotor to rotate an output shaft thereof at a rotational speed faster than a rotational speed of the rotor;
- a power generator connected to the output shaft of the step-up gear mechanism to generate electric power in accordance with the rotation of the output shaft;
- a flywheel to be rotated in accordance with torque of the rotor to maintain the rotation of an input shaft of the step-up gear mechanism; and
- a transmitting section to transmit the torque from the rotor to the flywheel when the rotational speed of the rotor is faster than the rotational speed of the flywheel, and suspend the transmission of the torque from the rotor to the flywheel when the rotational speed of the rotor is slower than the rotational speed of the flywheel, wherein the transmitting section comprises a one-way clutch mechanism between the rotary shaft and the step-up gear mechanism.

2. The input device as claimed in claim 1, wherein the power generating section further comprises:
- a magnet configured to rotate in accordance with the rotation of the output shaft of the step-up gear mechanism;
- a magnetic material with both ends thereof facing each other across the magnet to form a closed magnetic circuit with flux of the magnet; and
- a coil wound around the magnetic material to gain electric power in accordance with the flux extending through the magnetic material.

3. The input device as claimed in claim 1, further comprising a wireless transmitting section to transmit the detection signal.

4. The input device as claimed in claim 1, wherein the input section detects a movement in three dimensional directions.

5. The input device as claimed in claim 1, wherein the power source generating section has a booster circuit for raising voltage from the power storing section to a certain voltage.

6. The input device as claimed in claim 1, wherein the power supply circuit comprises at least one of a switching regulator, a series regulator, and a constant voltage circuit.

7. An input device, comprising:
- an input section generating and outputting an input signal corresponding to an operation of a device body of the input device;
- a coordinate detecting section detecting a rotating angle of the device body and an acceleration applied to the device body and outputting a detection signal corresponding to the detected rotating angle and the detected acceleration;
- a processing section generating coordinate data based on the detection signal supplied from the coordinate detecting section and generating input data based on the input signal supplied from the input section;
- a communicating section modulating and amplifying a carrier wave based on the coordinate data and the input data supplied by the processing section;
- a power generating section to generate electric power in accordance with the acceleration applied to the device body;
- a power storing section to store the electric power generated by the power generating section; and
- a power source generating section comprising a power supply circuit to generate power for driving the input section, the coordinate detecting section, the processing section, and the communicating section with the electric power generated by the power generating section or the electric power stored in the power storing section, wherein the power generating section comprises:
  - a rotor having a center of gravity at a position deviated from a rotary shaft of the rotor and, thus, being configured to rotate in accordance with the acceleration;
  - a step-up gear mechanism connected to the rotary shaft of the rotor to rotate an output shaft thereof at a rotational speed faster than a rotational speed of the rotor;
  - a power generator connected to the output shaft of the step-up gear mechanism to generate electric power in accordance with the rotation of the output shaft;
  - a flywheel to be rotated in accordance with torque of the output shaft of the step-up gear to maintain the rotation of an input shaft of the power generator; and
  - a transmitting section to transmit the torque from the step-up gear mechanism to the flywheel when the rotational speed of the step-up gear mechanism is faster than the rotational speed of the flywheel, and suspend the transmission of the torque from the step-up gear mechanism to the flywheel when the rotational speed of the step-up gear mechanism is slower than the rotational speed of the flywheel, wherein the transmitting section comprises a one-way clutch mechanism between the rotary shaft and the step-up gear mechanism.

8. The input device as claimed in claim 7, wherein the power generating section further comprises:
- a magnet configured to rotate in accordance with the rotation of the output shaft of the step-up gear mechanism;
- a magnetic material with both ends thereof facing each other across the magnet to form a closed magnetic circuit with flux of the magnet; and
- a coil wound around the magnetic material to gain electric power in accordance with the flux extending through the magnetic material.

9. The input device as claimed in claim 7, further comprising a wireless transmitting section to transmit the detection signal.

10. The input device as claimed in claim 7, wherein the input section detects a movement in three dimensional directions.

11. The input device as claimed in claim 7, wherein the power source generating section has a booster circuit for raising voltage from the power storing section to a certain voltage.

12. The input device as claimed in claim 7, wherein the power supply circuit comprises at least one of a switching regulator, a series regulator, and a constant voltage circuit.

* * * * *